Sept. 6, 1966     P. MARONEY     3,270,723

SELF-SUPERCHARGING ROTARY ENGINE

Filed Dec. 18, 1963     3 Sheets-Sheet 1

Peter Maroney
INVENTOR.

BY *Clarence A. O'Brien*
and *Harvey B. Jacobson*
Attorneys

Sept. 6, 1966 P. MARONEY 3,270,723
SELF-SUPERCHARGING ROTARY ENGINE
Filed Dec. 18, 1963 3 Sheets-Sheet 2
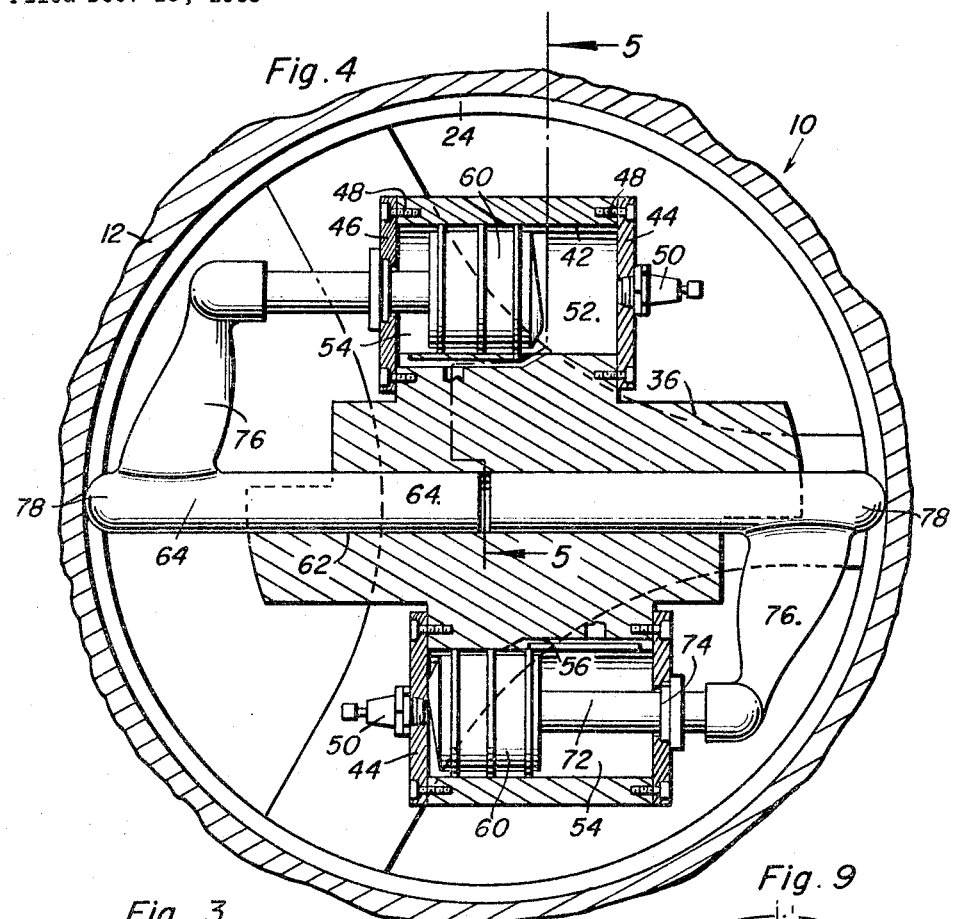
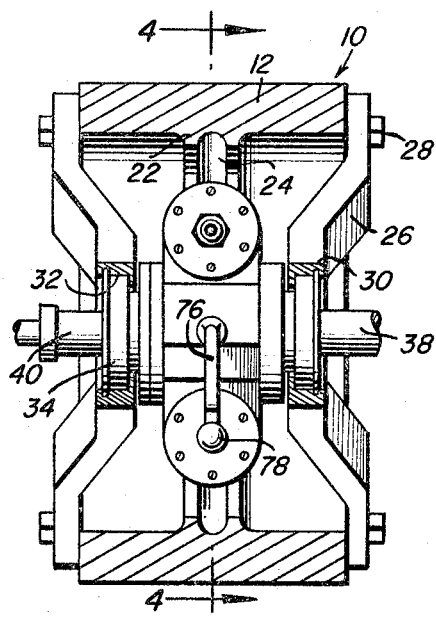
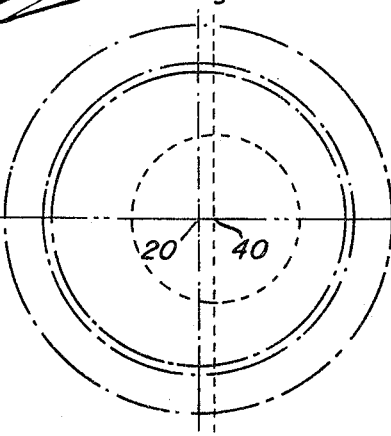
Peter Maroney
INVENTOR.

Sept. 6, 1966  P. MARONEY  3,270,723
SELF-SUPERCHARGING ROTARY ENGINE
Filed Dec. 18, 1963  3 Sheets-Sheet 3
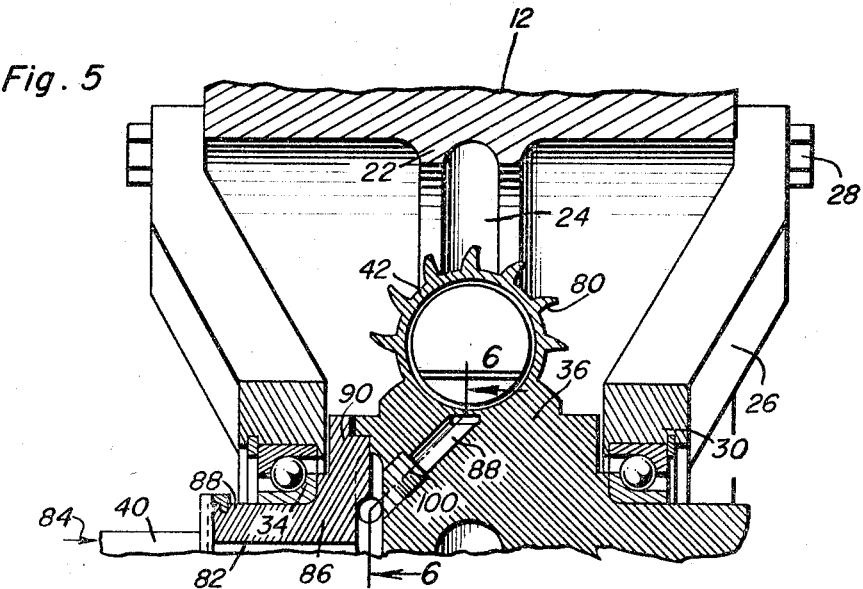
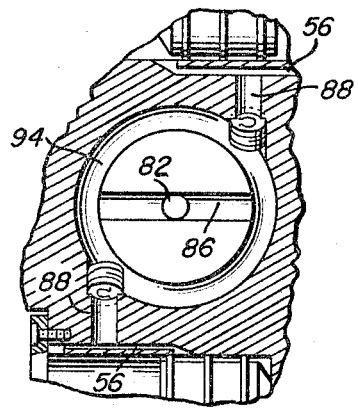
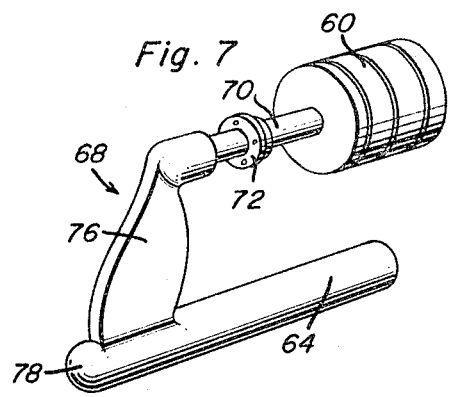
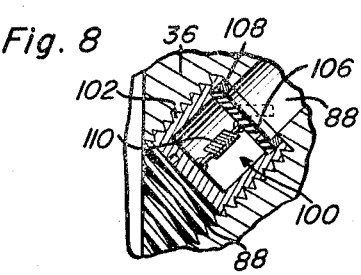
Peter Maroney
INVENTOR.
BY Clarence A. O'Brien
and Harvey B. Jacobson
Attorneys

United States Patent Office 3,270,723
Patented Sept. 6, 1966

3,270,723
SELF-SUPERCHARGING ROTARY ENGINE
Peter Maroney, 133 Boulder Road, Solvay, N.Y.
Filed Dec. 18, 1963, Ser. No. 331,488
8 Claims. (Cl. 123—43)

This invention comprises a novel and useful self-supercharging rotary engine and more particularly pertains to a rotary engine having an improved arrangement of its cylinders together with an improved means for transmitting the pressure of a motive fluid within a cylinder to a rotating shaft.

In its more comprehensive form, the present invention relates to an internal combustion engine of the rotating cylinder-type. In its more general aspects, however, the invention relates broadly to a rotary cylinder engine capable of operation by any suitable motive fluid supplied thereto under pressure.

It is the primary object of this invention to provide a rotary engine of the cylinder and piston type wherein the cylinders, pistons and the power takeoff means therefrom shall be so arranged as to obtain the utmost mechanical advantage in converting the energy of expanding fluid in a cylinder into power.

A further object of the invention is to provide a rotary engine having a novel piston assembly for converting the power of an expanding motive fluid into useful energy.

A more specific object of the invention is to provide a rotary engine having piston assemblies each consisting of a piston operated by the expanding force of motive fluid in a cylinder and a guide member rigidly connected thereto and which assembly in turn operates to transmit motion from the piston to a cam member.

A further object of the invention is to provide a rotary internal combustion engine which shall make use of rear compression cylinders for supercharging the power cylinders and increasing the force developed therein together with an improved means for supplying a combustible mixture to the rear compression and power cylinders of the engine.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a vertical longitudinal sectional view through the engine taken substantially upon the plane indicated by the section line 3—3 of FIGURE 1;

FIGURE 4 is a view taken upon an enlarged scale in vertical transverse section substantially upon a plane indicated by the section line 4—4 of FIGURE 3;

FIGURE 5 is a detail view taken upon an enlarged scale substantially upon the plane indicated by the section line 5—5 of FIGURE 4;

FIGURE 6 is a further detail view taken upon an enlarged scale substantially upon the plane indicated by the section line 6—6 of FIGURE 5;

FIGURE 7 is a perspective view of one of the piston assemblies of the engine;

FIGURE 8 is a detail view in section of an enlarged scale of a non-return valve assembly forming a part of the fuel supply means of the engine; and FIGURE 9 is a diagrammatic view showing the orientation of the centers of rotation of the engine rotor and the stationary cam track components of the invention.

In the accompanying drawings, the principles of this invention have been shown as applied to a rotary engine of the internal combustion engine-type. However, it will be appreciated that the principles of the invention are likewise applicable to a rotary cylinder type of engine in which other motive fluid such as steam, gases under pressure or even liquids under pressure may be employed to effect a controlled reciprocation of the pistons of the engine and convert the energy of the motive fluid into useful work and rotation of a driven shaft.

Figure 1:
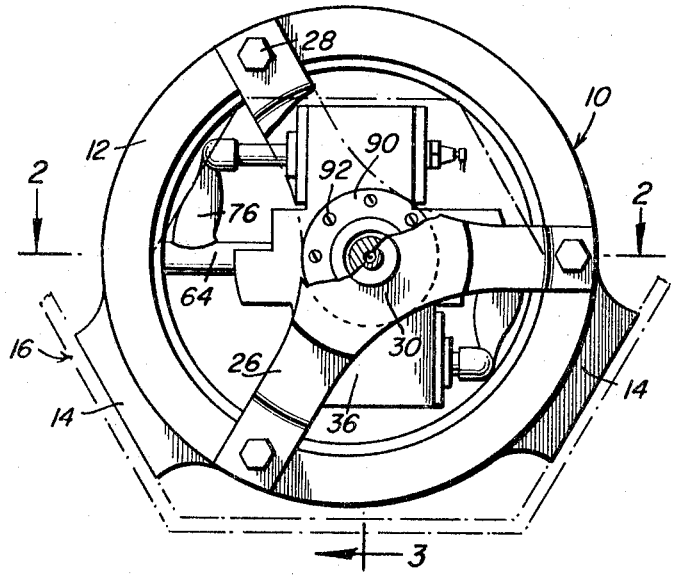
FIGURE 1 is a front elevational view, parts being broken away, of a preferred embodiment of an internal combustion engine in accordance with this invention, the engine being shown supported in a saddle-type of mounting structure indicated in phantom therein.

Referring first to FIGURE 1 it will be observed that the rotary engine in accordance with this invention is indicated generally by the numeral 10 and consists of a stationary cylindrical casing or stator 12 provided with a pair of supports 14 by which the engine may be mounted in a suitable saddle support indicated generally by the numeral 16 and shown in dotted lines in FIGURE 1. In this manner, the engine may be mounted in any suitable location as for example the chassis of a vehicle or the like. Inasmuch as it is the deails of construction and operation of the engine itself which forms the subject matter of this invention and not of its mounting in any suitable vehicle or support, a further description of the supporting means is deemed to be unnecessary.

Figure 2:
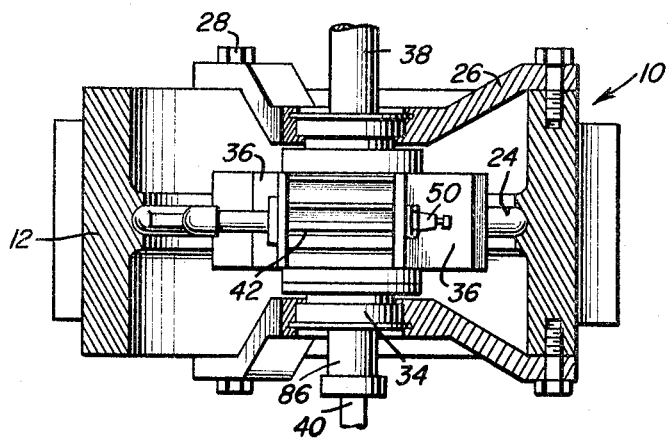
FIGURE 2 is a horizontal transverse sectional view taken substantially upon the plane indicated by the broken section line 2—2 of FIGURE 1.

As will be best observed from FIGURES 2–4, the engine 10 includes the previously mentioned stator 12 which preferably consists of a substantially cylindrical band or rim which is open at both of its sides and has a horizontal longitudinally extending axis which in FIGURE 9 is diagrammatically indicated at 20. Disposed medially of the stator 12 is a circumferentially extending rib 22 in which is formed a cam track 24 defining a continuous annular path in a rotational plane. This cam groove or cam track constitutes a part of the means by which the force of a motive fluid in the engine is converted into useful work.

Secured to each of the open sides of the stator 12 is a spider-like support structure consisting of the radially extending arms 26 having their outer ends detachably secured as by fastening bolts 28 to the stator 12 and having their inner ends inwardly offset and carrying a centrally and axially disposed bearing member 30. The bearing members 30 are apertured as at 32 and receive therein any suitable form of bearing assemblies 34 which may be of the ball or roller bearing type and which in themselves form no part of the present invention.

Disposed within the stator and cam track 24 is a rotor 36. Projecting axially from the opposite sides of the rotor are a pair of aligned shafts 38 and 40 which are journaled in the bearing assemblies 34 of the bearing members 30 to thereby rotatably support the rotor 36 within the stator. As will be apparent from the diagrammatic view of FIGURE 9, the axis of the rotor, indicated generally by the numeral 40 is eccentric with respect to the circular path of cam track 24 and is disposed in parallel relation to and is spaced slightly from the axis 20 of the path of cam track. Consequently, as the rotor revolves about its axis 40 it will be eccentric with respect to the stator so that during its revolution it approaches the right side of the stator more closely than it does the left side as viewed in FIGURE 4.

The rotor upon opposite sides of its axis of rotation, as shown in FIGURE 4, is provided with a pair of cylinders in the form of bores 42 each of which extends entirely through the rotor. These cylinders are arranged secantly and are provided with detachable cylinder heads as at 44 and 46, detachably secured thereto as by fasteners 48.

A spark plug 50 is mounted by each of the cylinder heads 44 and is operatively connected in any suitable form of igniting means, not shown. It suffices to understand that the ignition system is operated to produce a spark and thus initiate combustion of an explosive charge within a cylinder in properly timed relation to the rotary travel of the rotor unit.

The interior of the cylinder is provided with chambers in its opposite ends, consisting of a combustion chamber 52 adjacent the spark plug and a rear compression chamber 54 disposed in the opposite ends of the cylinder. A rear compression bypass passage as at 56 serves to connect the rearward extremity of the rear compression chamber 54 with the combustion chamber 52 as a piston element 60 approaches the rearward limit of its travel in the cylinder. Inasmuch as two cycle rear compression engines are well known, the operation of this portion of the invention will be well understood and need not be further set forth.

There is also provided a passage constituting a guide bore means and indicated by the numeral 62 and which extends diametrically through the rotor 36 along a slide axis intersecting the axis of rotation 40 and the circular path of the cam track in the rotational plane. Diametrically disposed guide bore means 62 provide guide bores at the opposite portions thereof for receiving the rod-like guide members 64 which with the piston 60 form a part of a pair of piston assemblies indicated generally by the numeral 68. Each piston assembly includes a piston 60 previously mentioned having a piston stem 70 slidable through a stuffing box 72, see FIGURE 4, which is disposed in the cylinder end wall 40. The arm 76 in turn is rigidly connected to the guide member 64 and it will be observed that the piston and its stem is disposed in parallel relation to the guide member 54 and is rigidly connected thereto by the web member or web portion 76 of the U-shaped piston assembly 68. Projecting beyond the web 76, the guide member 64 is provided with an extended semi-spherically rounded end portion 78 which constitutes a cam follower engaging the cam track at the intersection of the slide axis with the circular path of the cam track as shown in FIG. 4.

In the assembled device, the two piston assemblies 68 for the two cylinders 42 have the piston 60 slidably received in their respective cylinders while the guide members 64 of a rod-like construction are slidably and guidingly received in the guide bore means 62. The arrangement is such that the two adjacent aligned ends of the guide member 64 of a pair of aligned piston assemblies 68 are disposed in closely spaced relation within the guide bore means 62 as shown in FIGURE 4. In this position, the cam followers 78 are slidably received within the cam groove or cam tracks 24. The webs 76, it will be noted from FIGURE 4, are inclined to the longitudinal axis of the guide members 64 so that they will provide a clearance within the cam ring during the operation of the engine.

As suggested by the cooling fins 80 in FIGURE 5, the cylinders 42 may be air-cooled, the cooling air flowing through the open opposite ends of the stator. Other cooling means may be provided as may be desired.

In order to supply a combustible mixture to the engine cylinders, there is provided a fuel supply means. For this purpose one of the shafts as for example the shaft 40 is provided with an axial or longitudinally extending passage means 82 therein into which a combustible mixture is supplied from any suitable source, not shown, as indicated by the arrow 84.

As shown in FIGURE 5, a sleeve 86 surrounds the shaft 40 and has a bearing surface externally thereon which is received in the corresponding bearing assembly 34. At its inward end, the sleeve 86 is provided with a radially extending circular flange 90 which is suitably secured as by fastening screws 92, see FIGURE 1, to the adjacent surface of the rotor 36. Complementary annular recesses in the adjacent mating surfaces of the flange 90 and of the rotor 36, as shown in FIGURE 6, provide an annular combustible mixture distributing chamber 94 which is placed in communication with the axial shaft passage 82 as by diametrically extending connecting passages 86. Branch passages as at 88 help to connect the chamber 94 with the bypass passages 56 of the individual cylinders.

The arrangement is such that as the pistons are moved upwardly in the cylinder toward the spark plug they compress the charge in the combustion chamber 52 and by expansion in the rear compression chamber 54, draw in a charge to the bypass passage, the branch passage 88 and the combustible mixture passage 94. Upon the reverse stroke, the pistons upon their firing stroke and power stroke move outwardly of their cylinders and compress this incoming charge until the upper end of the piston uncovers the exit of the bypass passage whereupon the rear compressed charge is transferred to the working chamber 52.

The two cylinders are shown to be opposite in FIGURE 4 so that when one cylinder is working on its power stroke the other is compressing a charge to render it available for its next firing.

Referring to FIGURES 5, 6 and 8, it will be observed that the branch passages 80 are provided with a non-return check valve assembly 100 disposed therein. For this purpose there is provided an externally threaded valve cage 102 which is seated in the internally threaded end of the branch passage 88. A flap-type of valve member 106 cooperates with a valve seat 108 formed in this passage and by means of a spring 110 serves to permit flow of a combustible mixture through the branch passage toward the cylinder which thus prevents return flow therefrom.

A very important feature of this invention is that the power is generated in combustion chambers which are located at the periphery of the rotor so as to obtain the utmost possible mechanical advantage as the pistons react against the stationary cam track and due to the eccentricity of the axis of rotation of the rotor as compared to the axis of rotation of the stationary circular cam, there results rotary movement of the rotor. Power is then taken from the other rotor shaft 38 previously mentioned in any suitable manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotary engine comprising a stator, a circular cam track stationarily mounted in said stator, a rotor disposed in said stator and eccentrically in said cam track and mounted for rotation about a rotor axis parallel to the cam track axis, a pair of cylinders carried by said rotor on opposite sides of said rotor axis, said cylinders being parallel, the axes of said cylinders being displaced from the axis of rotation of said rotor, guide means in said rotor having a slide axis intersecting said rotor axis parallel to said cylinders, a piston assembly for each cylinder, said piston assembly including a piston and a guide member fixedly secured thereto, said piston and guide members being parallel and being respectively slidably received in said cylinder and in said guide means, and a cam follower on said guide member movably engaging said cam track where intersected by said slide axis.

2. The combination of claim 1 wherein said piston assembly is U-shaped with the piston and guide member constituting the arms of said U-shaped assembly and said cam follower being carried by its web portion.

3. The combination of claim 1 wherein said guide means comprises a bore extending diametrically through said rotor and the rotor axis, the guide members of the pair of piston assemblies being slidably received in the opposite ends of said bore in spaced end-to-end relation.

4. The combination of claim 1 including shafts extending axially from opposite sides of said rotor and rotatably supporting the latter, means supplying a motive fluid to said cylinders comprising a fluid inlet passage in one of said shafts, connecting passages from said shaft inlet passage to each of said cylinders.

5. The combination of claim 4 wherein said motive fluid supply means delivers a combustible mixture, igniting means causing combustion of said combustible mixture in said cylinder.

6. The combination of claim 1 wherein said cylinders have their axes disposed secantly of said cam track and at the radially outer portions of said rotor.

7. In a fluid operated device, a stator having an annular cam track defining a continuous path in a rotational plane, a rotor, bearing means secured to the stator mounting the rotor for rotation about a rotational axis, at least two pressure chambers mounted by the rotor, said pressure chambers having axes, said axes of the pressure chamber being displaced from the axis of rotation, piston means mounted in said chambers for reciprocatory movement parallel to said rotational plane, follower means slidably mounted by said rotor for movement along a slide axis intersecting the continuous path and the rotational axis in the rotational plane while engaged with the cam track at the intersections between the slide axis and the continuous path and means rigidly interconnecting the piston means and the follower means for movement together.

8. The combination of claim 7 wherein said follower means comprises a bore extending through said rotor along the slide axis, and a pair of guide rods slidably mounted in the bore having radially outer ends engaging the cam track.

References Cited by the Examiner

UNITED STATES PATENTS 229,187   6/1880   Rogers _____ 91—205 X

FOREIGN PATENTS 733,534   3/1943   Germany.
8,036     1911     Great Britain.

MARK NEWMAN, *Primary Examiner.*

WENDELL E. BURNS, *Examiner.*